Patented Feb. 25, 1930

1,748,785

UNITED STATES PATENT OFFICE

WILBER B. MILLER, OF FLUSHING, AND ARTHUR R. LYTLE, OF ELMHURST, NEW YORK, ASSIGNORS TO OXWELD ACETYLENE CO., A CORPORATION OF WEST VIRGINIA

FLUX

No Drawing.   Application filed August 28, 1928.   Serial No. 302,649.

Our invention relates to fluxing materials, and particularly to fluxes adapted to autogeneous welding. It has for one of its principal objects the provision of a flux adapted to use in the welding of the aluminum bronzes.

Forge welding processes are very old, and the art of fluxing in such processes is well developed, but they are found to be applicable to only a very limited number of the list of known metals and alloys. The new process of autogeneous or fusion welding has opened a broadly new field of operations for welding methods. It is found, however, that the old art of fluxing as applied to forge welding is almost entirely inapplicable to the new fusion welding process and accordingly a broadly new art of fluxing, applicable thereto is in process of development.

Our invention provides a new and useful flux for fusion welding processes whereby metals and alloys, unweldable by prior methods, may readily be welded and a new and useful weld obtained. The aluminum bronzes particularly have been found extremely difficult to weld because of the high temperatures required, and the rapid production of a surface layer at the weld of mixed aluminum and copper oxides, infusible at the welding temperature, which prevents coalescence of the metal. Our invention provides a new, useful and simple combination of previously known fluxing substances, which when combined according to our invention permit of the simple, rapid, and easy welding of the aluminum bronzes and of other metals.

Our flux consists, in essence, of the substances borax, silica and a fluoride, combined in a particular manner, which when so combined produces a flux having the desired properties.

Other objects and details of our invention will be apparent from the following description:

In the preparation of the flux of our invention we find it convenient first to prepare a boro-silicate glass by fusing together from 2 to 4 parts of ordinary borax and one part of silica, both materials being preferably in a finely divided form and thoroughly mixed before fusion. The fusion of the two substances is desirably continued until a homogeneous melt results. To this melt may then be added about one part of lithium fluoride. This may be added to the melt while in the fused condition or after cooling and grinding. In the former instance the material may then be cooled and pulverized. The preparation may desirably contain about 30% of $SiO_2$, about 40% of $B_2O_3$, about 15% of alkali and about 15% of fluorine. These proportions are only approximate and may be varied according to the needs of the welder and the conditions under which the welding is done.

This flux produces several new and useful results hitherto unknown. The viscosity of the mixture is high at the welding temperature of the aluminum bronzes and accordingly the fused flux maintains a tenacious protecting blanket over the fused metal in the weld and is not driven away by the blast of the welding flame as occurs with more fluid fluxes. The flux may conveniently be applied in the form of a water paste made from the pulverized preparation. The flux substances being only slightly soluble in water, the water in the paste does not combine with them to give a product which intumesces, as it does with borax alone, or as it does with mixtures containing hydrated borax. The flux has a satisfactory fluidity permitting it to cover the weld completely, at the welding temperature, as distinguished from silica alone, or from silica admixed with substances which do not lower its melting point. Fluorides are also found to be useless alone, because of the fact that their melting points are too low and they volatilize when applied at high temperatures.

The boro-silicate glass as produced in the first step of our process is known to have a high solvent power for many of the metal oxides, in addition to its property of excluding air, reducing oxidation of the metal and similar effects. We find that the solvent power of this preparation, particularly for aluminum oxide, is greatly increased by the inclusion of the fluoride substance. Such an inclusion is however, possible only under carefully controlled conditions, since under ordinary conditions a mixture of silicate and fluoride, when heated to the fusing temperature, evolves large quantities of gaseous silicon tetrafluoride, wasting the flux and destroying its fluxing action if the heating is continued for any length of time. We find, in the flux of our invention, that, the silica being combined with the borax, it is held in combination in such a manner that only imperceptible and negligible quantities of silicon tetraflouride are produced. Accordingly the flux of our invention shows a high solvent power for the oxides of aluminum and copper; and the aluminum bronzes which cannot be satisfactorily welded by any other process, become easy alloys to weld when the flux of our invention is used.

We have above described a preferred embodiment of the flux of our invention. We find however, that substantial modification therefrom is possible without departure from the spirit of the invention. The proportion of boric oxide may be varied within the range of 10% to 55%, and the silica over the range of 5% to 45% without loss of utility. The desirable range of fluoride substance is 10% to 50%. Other fluorides than the lithium fluoride may be used. A common fluoride substance is cryolite which is also suitable for inclusion in our flux. Other fluorides such as sodium and potassium fluorides are likewise suitable and the proportion of each may be varied according to the complexity of the welding undertaken.

By our invention we have thus produced a new and useful flux adapted to the welding of many difficult alloys.

While we have disclosed but a limited number of embodiments of our invention, it is capable of still other modifications therefrom without departure from the spirit thereof and we desire therefore that only such limitations shall be imposed upon the appended claims as are stated therein or required by the prior art.

We claim as our invention:

1. A flux containing 10% to 50% of a fluoride, with the remainder principally boro-silicate glass.

2. A flux containing 10% to 50% of lithium fluoride, with the remainder principally boro-silicate glass.

3. A flux containing 10% to 50% of a fluoride, with the remainder principally a boro-silicate glass containing more $B_2O_3$ than $SiO_2$.

4. A flux containing 10% to 50% of lithium fluoride, with the remainder principally a boro-silicate glass containing about 40% $B_2O_3$ and about 30% $SiO_2$.

5. A flux containing 10% to 50% of a fluoride, with the remainder principally a boro-silicate glass containing about 10% to 55% $B_2O_3$ and 5% to 45% $SiO_2$.

In testimony whereof, we affix our signatures.

WILBER B. MILLER.
ARTHUR R. LYTLE.